US007008182B2

(12) United States Patent
Kopp et al.

(10) Patent No.: US 7,008,182 B2
(45) Date of Patent: Mar. 7, 2006

(54) EXHAUST-GAS-TURBINE CASING

(75) Inventors: Adrian Kopp, Kirchdorf (SE); Josef Bättig, Egliswil (SE); Marcel Meier, Untersiggenthal (SE)

(73) Assignee: ABB Turbo Systems AG, Baden (CH)

( * ) Notice: Subject to any disclaimer, the term of this patent is extended or adjusted under 35 U.S.C. 154(b) by 65 days.

(21) Appl. No.: 10/793,275

(22) Filed: Mar. 5, 2004

(65) Prior Publication Data

US 2005/0053463 A1 Mar. 10, 2005

(30) Foreign Application Priority Data

Mar. 19, 2003 (EP) ................................ 03405190

(51) Int. Cl.
*F01D 25/28* (2006.01)
(52) U.S. Cl. .................... 415/136; 415/205; 415/213.1
(58) Field of Classification Search ................ 415/134, 415/136, 138, 205, 213.1, 214.1, 229, 230
See application file for complete search history.

(56) References Cited

U.S. PATENT DOCUMENTS 3,408,046 A * 10/1968 Wollenweber, Jr. ......... 415/205

| 4,786,232 A | 11/1988 | Davis et al. |
| 5,503,490 A | 4/1996 | Melton |
| 6,287,091 B1 | 9/2001 | Svihla et al. |

FOREIGN PATENT DOCUMENTS

| DE | 1018071 | 10/1957 |
| DE | 1152703 | 8/1963 |
| EP | 0118051 A2 | 9/1984 |

* cited by examiner

*Primary Examiner*—Edward K. Look
*Assistant Examiner*—Richard A. Edgar
(74) *Attorney, Agent, or Firm*—Buchanan Ingersoll PC

(57) ABSTRACT

The exhaust-gas turbine comprises a turbine wheel arranged on a shaft, a bearing casing for the bearing arrangement of the rotatable shaft, a gas-inlet casing supported on the bearing casing and concentrically surrounding the bearing casing in the supporting region, and a centering ring for centering the gas-inlet casing relative to the shaft mounted in the bearing casing. The centering ring and either the bearing casing or the gas-inlet casing comprise grooves and either radially or axially unidirectional centering lugs for engaging in the grooves. Due to the radially or axially unidirectional centering lugs with corresponding grooves, at least one of the connections between the bearing casing and the centering ring and the centering ring and the gas-inlet casing is not positive-locking, as a result of which any desired positioning of the gas-inlet casing relative to the bearing casing is made possible.

10 Claims, 3 Drawing Sheets

EXHAUST-GAS-TURBINE CASING

TECHNICAL FIELD

The invention relates to the field of turbochargers operated by exhaust gas.

It relates to a turbine casing according to the preamble of patent claim 1, an exhaust-gas turbine having such a turbine casing, and a turbocharger having such an exhaust-gas turbine.

PRIOR ART

Exhaust-gas turbochargers are used for increasing the output of internal combustion engines. They comprise an exhaust-gas turbine, driven by the exhaust gases of the internal combustion engine, and a compressor for compressing the fresh air fed to the internal combustion engine. In this case, the turbine wheel and compressor wheel are as a rule arranged on a common shaft. In the bottom output range up to a few megawatts, turbochargers with a turbine wheel subjected to radial flow and an internal bearing arrangement of the shaft are mainly used.

In the case of uncooled exhaust-gas turbochargers, in which the gas-conducting passages are not cooled, the exhaust-gas temperature at the turbine inlet is higher, as a result of which the thermal efficiency of the machine and the output delivered to the air compressor per exhaust-gas quantity increases.

The uncooled outer turbine casing, the gas-inlet casing, which during operation has a temperature of 650° C. for example, is usually fastened directly on the bearing casing, which at 150° C., for example, is substantially cooler. Within certain ranges of application, the bearing casing, in contrast to the gas-conducting passages, is cooled to said temperature.

To fasten the turbine casing on the bearing casing, straps or what are referred to as profile-clamp or V-band connections are used in conventional exhaust-gas turbines. In order to achieve as high an efficiency as possible, the air gap between the turbine blades and the turbine casing is to be kept as small as possible. However, this means that this casing wall and the turbine wheel are always centered relative to one another, in particular during operation under full load and with corresponding thermal loading of all parts. Since the centering seating of the turbine casing relative to the bearing casing sometimes widens radially as a result of the high temperature difference between the bearing casing and the turbine casing, the turbine casing may become offset relative to the bearing casing and in particular relative to the turbine shaft mounted therein, i.e. the turbine casing is no longer centered in the radial direction relative to the shaft and the turbine wheel arranged thereon. Such an offset, which can be additionally aided by external actions of force, leads to the tips of the turbine blades touching the casing wall of the turbine casing, to corresponding wear or defects and, associated therewith, to considerable losses in efficiency of the exhaust-gas turbine.

EP 0 118 051 shows how an offset of the hotter component can be avoided by means of groove/tongue connections which are arranged in a star shape and are movable in the radial direction.

This conventional, relatively costly solution approach, in which the production process, in addition to pure turning operations, also includes milling operations, only permits a restricted number of different casing positions on account of the discrete number of groove/tongue connections. With 3, 6 or 12 evenly distributed lugs or grooves, changes in position of the outer turbine casing relative to the bearing casing of 120°, 60° or 30° can be achieved. However, a solution approach in which the position of the outer turbine casing relative to the bearing casing can be set in an essentially infinitely variable manner is desirable.

BRIEF DESCRIPTION OF THE INVENTION

The object of the invention is consequently to improve the casing of an exhaust-gas turbine in such a way that the exhaust-gas turbine has a higher efficiency due to improved centering of the turbine casing relative to the shaft mounted in the bearing casing, with at the same time the greatest possible flexibility with regard to the positioning of the outer parts of the turbine casing relative to the bearing casing.

According to the invention, this object is achieved with the characterizing features of patent claim 1.

The advantages of the invention are to be seen in the fact that, due to the radially or axially unidirectional centering lugs with corresponding grooves, in each case at least one of the connections between the bearing casing and the centering ring and respectively the centering ring and the gas-inlet casing is not positive-locking, as a result of which any desired positioning of the gas-inlet casing relative to the bearing casing is made possible.

This type of centering is suitable for all the current types of connection between bearing casing and gas-inlet casing, since, according to the invention, the centering is effected by components in the interior of the turbine casing in the supporting region of the gas-inlet casing on the bearing casing.

Further advantages follow from the dependent claims.

BRIEF DESCRIPTION OF THE DRAWINGS

Exemplary embodiments of the turbine casing according to the invention are shown schematically and explained in more detail below with reference to the figures. Elements having the same effect are provided with the same designations in all the figures. In the drawing.

WAYS OF IMPLEMENTING THE INVENTION

Figure 1:
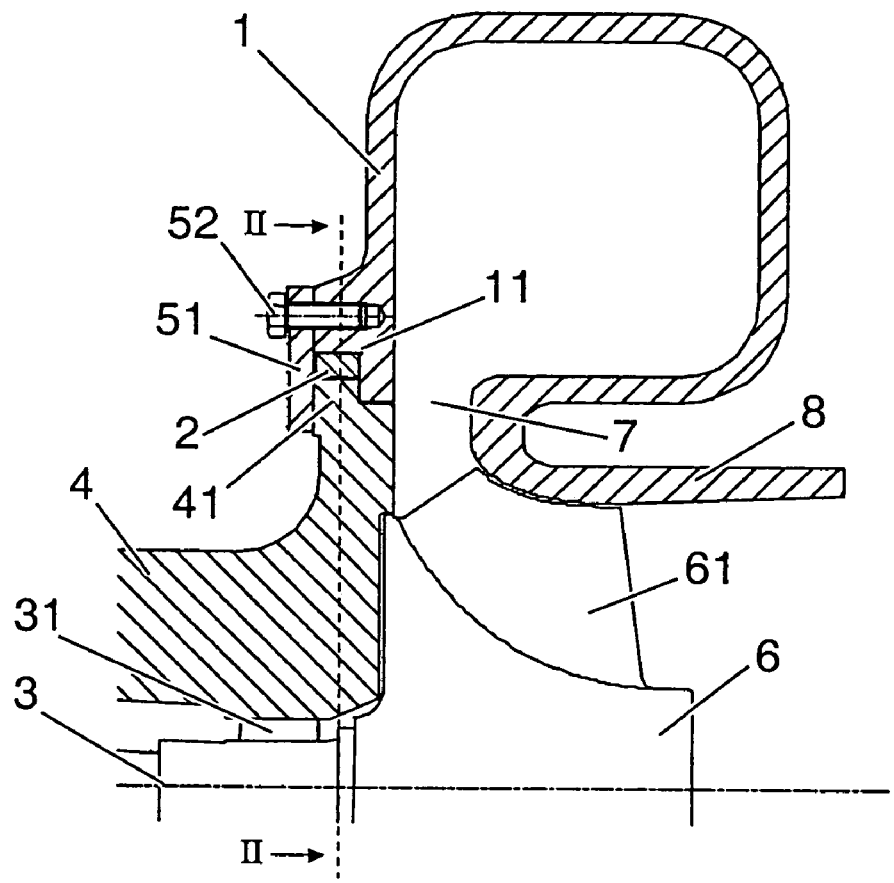
FIG. 1 shows a schematic view of a turbine casing according to the invention with a centering ring according to a first exemplary embodiment.

The exhaust-gas turbocharger mainly comprises an exhaust-gas turbine, shown schematically as a radial-flow turbine in FIG. 1, and a compressor (not shown). The exhaust-gas turbine mainly comprises a casing and a turbine wheel 6 rotatably arranged therein. The casing comprises a radially outer, spiral gas-inlet casing 1, a gas-outlet-side casing wall 8, and a bearing casing 4. The turbine wheel 6 with its moving blades 61 is arranged on a shaft 3 rotatably mounted by means of bearings 31. On the compressor side, a compressor wheel (likewise not shown) is arranged on the shaft.

The gas-inlet casing merges downstream into an intake passage 7 for the exhaust gases of an internal combustion engine (likewise not shown) connected to the exhaust-gas turbocharger. The intake passage is defined by the gas-outlet-side casing wall 8 and by the gas-inlet casing 1 and bearing casing 4.

A nozzle ring for the flow deflection can be arranged in the intake passage 7 between gas-inlet casing and bearing casing and the gas-outlet-side casing wall.

Figure 2:
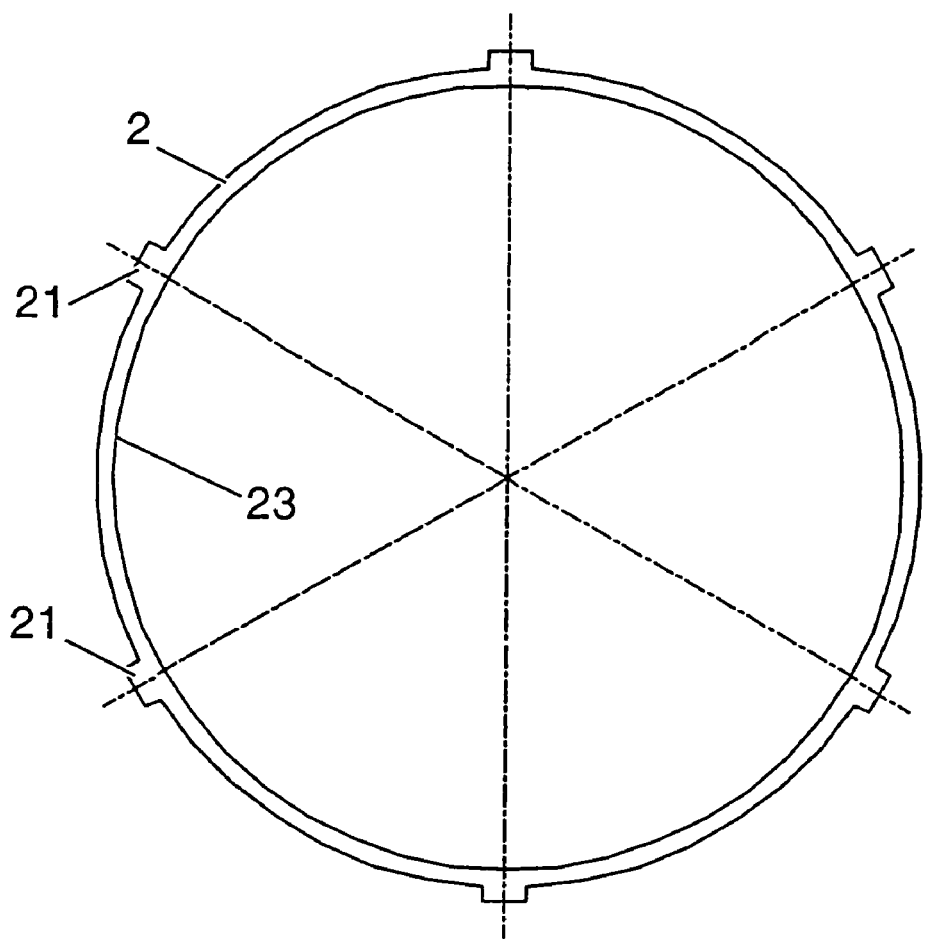
FIG. 2 shows a view of a section along II—II through the centering ring according to FIG. 1.

In the embodiment shown, the gas-inlet casing 1 is connected to the bearing casing 4 by means of straps 51, the straps, fastened to the gas-inlet casing by means of screws 52, allowing certain movements of the gas-inlet casing 1 relative to the bearing casing 4 in the radial direction. In the stationary state of the exhaust-gas turbine, when gas-inlet casing and bearing casing are cold, the gas-inlet casing rests with the support 11 on the support 41 of the bearing casing and is thereby centered relative to the shaft 3 and the turbine wheel 6 arranged thereon. In the supporting region, a centering ring 2 is arranged radially between the two casing parts. As shown in FIG. 2, the centering ring has a plurality of centering lugs 21, for example 5 to 7 centering lugs 21, which engage in corresponding centering grooves in one of the casing parts. The centering lugs are arranged so as to be distributed over the entire circumference of the centering ring and may be arranged radially inward, radially outward or in an axially oriented manner.

Figure 3:
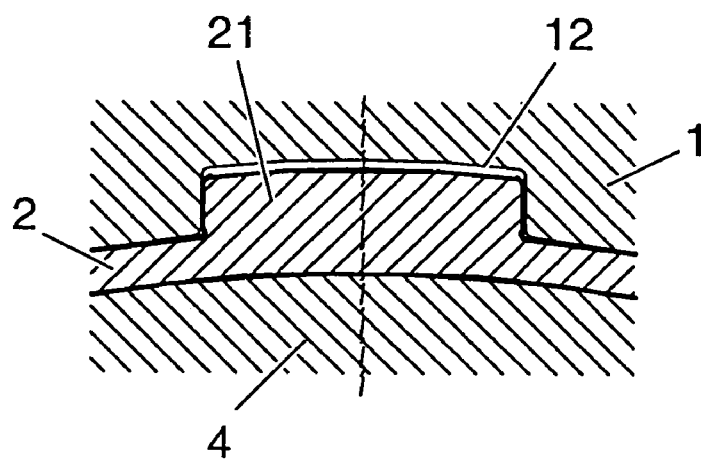
FIG. 3 shows an enlarged view of the centering ring according to FIG. 2.

In the first exemplary embodiment, the centering lugs are directed radially outwards and the corresponding grooves are incorporated in the gas-inlet casing 1. FIG. 3 shows an enlarged detail of the centering ring 2 with a centering lug 21 which engages in the groove 12 of the gas-inlet casing. In the operating state of the exhaust-gas turbine, the centering ring 2 is frictionally connected to the bearing casing 4 by being pressed in place on the radially inner bearing casing 4 with the side remote from the lugs and grooves.

In the operating state of the exhaust-gas turbine, the gas-inlet casing heats up to a greater degree than the centering ring and to a much greater degree than the bearing casing. The pressing ensures that the centering ring is not released from the bearing casing. The centering ring therefore remains centered relative to the bearing casing even in the operating state. The gas-inlet casing, which heats up to a very much higher degree compared with the bearing casing and therefore threatens to lose the centering seating on the bearing casing due to heat-induced expansions in the radial direction, remains centered relative to the bearing casing by means of the radial guidance of the centering lugs in the grooves.

In this case, the pressing may be effected via a cone. That side 23 of the centering ring which is remote from the centering lugs and the opposite surface of the bearing casing are beveled in a cone shape. The cone angle, i.e. the angle between the surface 23 and the axis of the shaft 3, is advantageously selected in such a way that the centering ring, when the casing connection is released, is automatically released again from the bearing casing and the conical press fit therefore has no self-locking. This is the case at a cone angle within the range of 15°–30°.

The pressing can also be achieved by only one of the two opposite sides being beveled in a cone shape, that is to say either that side of the centering ring which is remote from the centering lugs or the opposite surface of the bearing casing, whereas the other side is of cylindrical shape.

Figure 4:
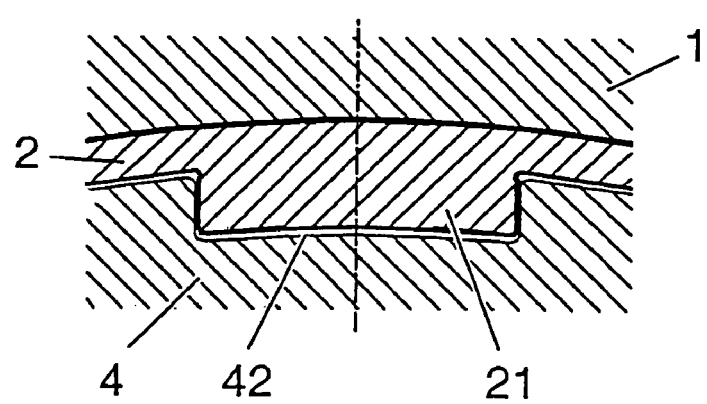
FIG. 4 shows an enlarged view of the centering ring according to a second exemplary embodiment of the turbine casing according to the invention.

FIG. 4 shows a correspondingly enlarged detail of the second exemplary embodiment, in which the centering lugs 21 are directed radially inward and the corresponding grooves 42 are incorporated in the bearing casing 4. The centering ring 2 is pressed into the gas-inlet casing 1 with the radially outer side remote from the lugs and the grooves.

The further figures show, in an enlarged manner, how the centering ring is fitted between gas-inlet casing and bearing casing.

Figure 5:
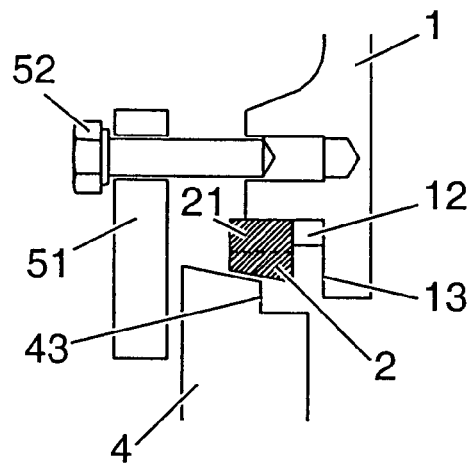
FIG. 5 shows an enlarged view of the first exemplary embodiment of the turbine casing according to the invention in the preassembled state.
Figure 6:
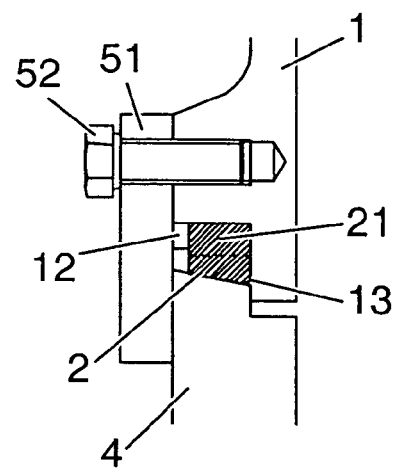
FIGS. 6 and 7 show enlarged views of the first exemplary embodiment of the turbine casing according to the invention in the assembled state.
Figure 7:
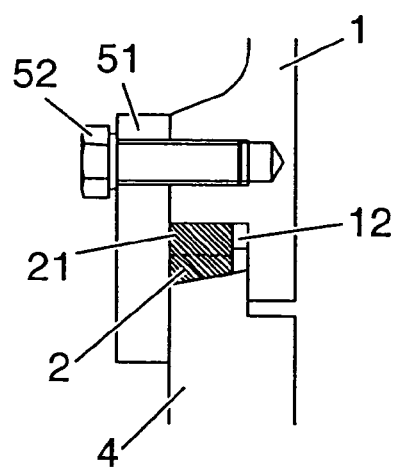

FIGS. 5 to 7 show the first exemplary embodiment with grooves 12 indorporated in the gas-inlet casing 1 and centering lugs 21 directed radially outward. When the gas-inlet casing 1 is being fitted on the bearing casing 4, the centering ring 2, according to FIG. 5, is inserted between the casing parts in the axial direction. In the process, the radially outer centering lugs 21 are to be aligned with the grooves 12 in the gas-inlet casing. The orientation of the centering ring relative to the bearing casing may be selected in any desired manner, thereby also resulting in correspondingly free positioning of the gas-inlet casing relative to the bearing casing. The two casing parts are then pushed against one another in the axial direction by means of strap 51 and screw 52 until corresponding axial stops 43 and 13 touch one another. In the process, the centering ring 2 is pushed onto the bearing casing 4 and pressed against it. Owing to the cone-shaped profile, a radial press fit which is simple to realize is obtained.

FIG. 7 shows a slightly modified variant of the first exemplary embodiment in which the cone points in the other axial direction. Accordingly, the centering ring 2, during assembly, is not inserted axially between the two casing parts, but is pushed in from the compressor side. When the two casing parts are being screwed tight, the centering ring 2 is pushed by the straps 51 onto the cone of the bearing casing and is firmly pressed thereon.

Figure 8:
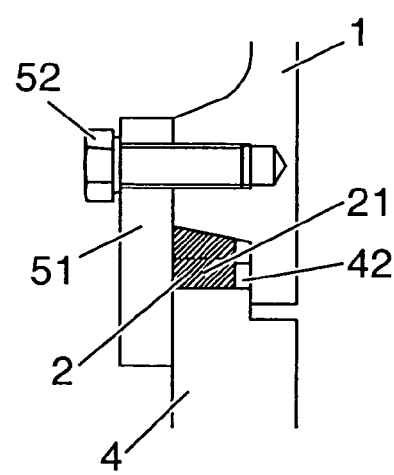
FIG. 8 shows an enlarged view of the second exemplary embodiment of the turbine casing according to the invention.

FIG. 8 shows the second embodiment with grooves 42 incorporated in the bearing casing 4 and centering lugs 21 directed radially inward. When the gas-inlet casing 1 is being fitted on the bearing casing 4, the centering ring 2 is again inserted between the casing parts in the axial direction. In the process, the radially inner centering lugs 21 are to be aligned with the grooves 42 in the bearing casing. The orientation of the centering ring relative to the gas-inlet casing may be selected in any desired manner, thereby also resulting in correspondingly free positioning of the gas-inlet casing relative to the bearing casing. The two casing parts are then pushed against one another in the axial direction by means of strap 51 and screw 52 until the corresponding axial stops 43 and 13 touch one another. In the process, the centering ring 2 is pushed into the gas-inlet casing 1 and pressed in place. Owing to the cone-shaped profile, a radial press fit which is simple to realize is obtained. In the second embodiment shown of the turbine casing according to the invention, a centering ring which heats up to a considerable degree is advantageously used. The heated centering ring expands together with the likewise hot gas-inlet casing and remains centered owing to the pressing relative to the gas-inlet casing. The centering ring and the gas-inlet casing remain centered relative to the bearing casing due to the radial guidance of the centering lugs in the grooves of the bearing casing.

Despite the positive-locking connection between centering ring and the casing part provided with the grooves, the position of the gas-inlet casing relative to the bearing casing can be set in an infinitely variable manner, since there is merely a frictional press connection between the centering ring and the other casing part, but no positive-locking connection.

Instead of centering lugs, the centering ring may also have corresponding grooves. The lugs are then arranged in the bearing casing or in the gas-inlet casing.

Instead of a one-piece centering ring, a plurality of centering-ring segments, for example three centering-ring segments, may be joined together to form a centering ring. The centering-ring segments are hooked together at the ends in the radial or axial direction. The centering ring, suitable in particular for large turbines and subdivided into a plurality of segments, can be produced more cost-effectively and is simpler to fit.

LIST OF DESIGNATIONS

1 Gas-inlet casing
11 Support
12 Centering grooves
13 Axial stop
2 Centering ring
21 Centering lugs
23 Pressure surface
3 Shaft
31 Inner bearing
4 Bearing casing
41 Support
42 Centering grooves
43 Axial stop
51 Strap
52 Fastening means
6 Turbine wheel
61 Blades
7 Intake passage
6 Gas-outlet-side casing wall

What is claimed is:

1. A turbine casing, comprising a bearing casing for the bearing arrangement of a rotatable shaft, a gas-inlet casing supported on the bearing casing and concentrically surrounding the bearing casing in the supporting region, and a centering ring for centering the gas-inlet casing relative to the shaft mounted in the bearing casing, the centering ring and either the bearing casing or the gas-inlet casing comprising intermeshing centering means, wherein the centering means comprise grooves and either radially or axially unidirectional centering lugs for engaging in the grooves, and wherein there is a frictional connection between the casing which does not comprise the centering means, that is to say either the gas-inlet casing or the bearing casing, and the centering ring.

2. The turbine casing as claimed in claim 1, wherein the centering lugs are arranged on the centering ring and the grooves are incorporated in either the bearing casing or the gas-inlet casing.

3. The turbine casing as claimed in claim 1, wherein the grooves are incorporated in the centering ring and the centering lugs are arranged on either the bearing casing or the gas-inlet casing.

4. The turbine casing as claimed in claim 1, wherein the centering ring is pressed in place on the bearing casing or the gas-inlet casing with the side remote from the centering means.

5. The turbine casing as claimed in claim 4, wherein that side of the centering ring which is remote from the centering means and/or the casing surface onto which the centering ring is pressed have/has a conical profile.

6. The turbine casing as claimed in claim 4, wherein the cone angle, at 15°–30°, is selected in such a way that the press fit between centering ring and casing surface is not self-locking.

7. The turbine casing as claimed in claim 1, wherein the bearing casing has an axial stop in the supporting region, which axial stop is pressed against an axial stop of the gas-inlet casing with means for axially fastening the gas-inlet casing to the bearing casing, and wherein the centering ring arranged radially between the axial stop of the bearing casing and the gas-inlet casing is pressed in place on the bearing casing or the gas-inlet casing by the axial fastening of the gas-inlet casing to the bearing casing.

8. The turbine casing as claimed in claim 1, wherein the centering ring comprises a plurality of centering-ring segments hooked one inside the other.

9. An exhaust-gas turbine, comprising a turbine casing as claimed in claim 1, having a gas-inlet casing and a bearing casing and also a shaft rotatably mounted in the bearing casing, in which case the gas-inlet casing is centered with the bearing casing relative to the shaft and can be connected at any desired angle.

10. A turbocharger, comprising an exhaust-gas turbine as claimed in claim 9.

* * * * *